(12) United States Patent
Lee et al.

(10) Patent No.: US 12,468,539 B2
(45) Date of Patent: Nov. 11, 2025

(54) METHOD AND SYSTEM FOR GENERATING INTERMEDIATE REPRESENTATION FOR PROGRAM FOR EXECUTION ON ACCELERATOR

(71) Applicants: MOREH CORP., Seoul (KR); SEOUL NATIONAL UNIVERSITY R&DB FOUNDATION, Seoul (KR)

(72) Inventors: Jaejin Lee, Seoul (KR); Jungho Park, Seoul (KR); Gangwon Jo, Seoul (KR); Heehoon Kim, Daejeon (KR); Jinpyo Kim, Seoul (KR)

(73) Assignees: MOREH CORP., Seoul (KR); SEOUL NATIONAL UNIVERSITY R & DB FOUNDATION, Seoul (KR)

( * ) Notice: Subject to any disclaimer, the term of this patent is extended or adjusted under 35 U.S.C. 154(b) by 69 days.

(21) Appl. No.: 18/533,041

(22) Filed: Dec. 7, 2023

(65) Prior Publication Data

US 2024/0103877 A1 Mar. 28, 2024

Related U.S. Application Data

(63) Continuation of application No. PCT/KR2022/008508, filed on Jun. 15, 2022.

(30) Foreign Application Priority Data

Jun. 16, 2021 (KR) .......... 10-2021-0077966
Jun. 15, 2022 (KR) .......... 10-2022-0072640

(51) Int. Cl.
 *G06F 9/38* (2018.01)
(52) U.S. Cl.
 CPC .............. *G06F 9/3836* (2013.01); *G06F 9/38* (2013.01)

(58) Field of Classification Search
 CPC . G06F 9/3836; G06F 9/38; G06F 8/44; G06F 9/3885; G06F 9/30025;
 (Continued)

(56) References Cited

U.S. PATENT DOCUMENTS 8,046,202 B1 * 10/2011 Yang ................. G06F 8/20
 717/136
2003/0233643 A1 * 12/2003 Thompson ........ G06F 9/3842
 712/E9.05

(Continued)

FOREIGN PATENT DOCUMENTS

GB 2411990 A * 9/2005 ......... G06F 9/45516

OTHER PUBLICATIONS

International Search Report for PCT/KR2022/008508 by Korean Intellectual Property Office dated Sep. 1, 2022.

(Continued)

*Primary Examiner* — Farley Abad
(74) *Attorney, Agent, or Firm* — BROADVIEW IP LAW, PC

(57) ABSTRACT

A method for generating an intermediate representation for a program for execution on an accelerator is executed by one or more processors, and includes hooking information on instruction from a program, determining whether the hooked information on instruction is associated with an accelerator, if it is determined that the information on instruction is associated with the accelerator, generating a first intermediate representation for the instruction using information on input and output data and information on instruction included in the instruction, and generating a second intermediate representation for the program for one or more accelerators using the first intermediate representation, and the first intermediate representation and the second intermediate representation include a plurality of data nodes, one or (Continued)

more operation nodes, and a plurality of edges indicating an input and output relationship between the plurality of data nodes and the one or more operation nodes.

16 Claims, 7 Drawing Sheets

(58) Field of Classification Search
CPC ..... G06F 9/30072; G06F 9/3824; G06N 3/04; G06N 3/045; G06N 3/08; G06N 3/105; G06N 3/063
See application file for complete search history.

(56) References Cited

U.S. PATENT DOCUMENTS

2019/0278593 A1* 9/2019 Elango ................ G06F 9/30065
2019/0391796 A1* 12/2019 Brady ..................... G06F 8/458

OTHER PUBLICATIONS

Li, Mingzhen et al. (2020). "The Deep Learning Compiler: A Comprehensive Survey", IEEE Transactions on Parallel and Distributed Systems. arXiv:2002.03794v1 [cs.DC].
Geifman, Amnon (2021). "Graph Compilers for Deep Learning: Definition, Pros Cons, and Popular Examples", Deci. URL: https://deci.ai/blog/graph-compilers/?nowprocket=1.

* cited by examiner

METHOD AND SYSTEM FOR GENERATING INTERMEDIATE REPRESENTATION FOR PROGRAM FOR EXECUTION ON ACCELERATOR

CROSS-REFERENCE TO RELATED APPLICATIONS

The present application is a continuation of International Patent Application No. PCT/KR2022/008508, filed Jun. 15, 2022, which is based upon and claims the benefit of priority to Korean Patent Application No. 10-2021-0077966, filed on Jun. 16, 2021, and Korean Patent Application No. 10-2022-0072640, filed on Jun. 15, 2022. The disclosures of the above-listed applications are hereby incorporated by reference herein in their entirety.

TECHNICAL FIELD

The present disclosure relates to a method and system for generating an intermediate representation for a program for execution on an accelerator, and specifically, to a method and system for generating, from a program, an intermediate representation corresponding to information about instructions and converting the intermediate representation into an intermediate representation for execution on an accelerator, thereby executing the program on the accelerator.

BACKGROUND

As the size of input and output data required to train a deep learning model increases and the size of the model increases, the use of an accelerator is essential to handle the increasing amount of operations. In general, deep learning frameworks implemented in advance with the functions necessary for inter-tensor operations and model training support the functions that enable the performance of the inter-tensor operations on the accelerator. Users can easily utilize a single accelerator by setting a device for performing the operation.

As the scale of deep learning models has recently increased, it is essential to use multiple accelerators for model training to handle the amount of operations. Meanwhile, in order to generate a deep learning program that utilizes multiple accelerators, it is necessary to manually perform various settings such as connection relationships between accelerators and nodes, communication frameworks, etc., and significantly modify the related program that utilizes a single accelerator.

SUMMARY

In order to solve one or more problems (e.g., the problems described above and/or other problems not explicitly described herein), the present disclosure provides a method for, a non-transitory computer-readable recording medium storing instructions for, and an apparatus (system) for generating an intermediate representation for a program for execution on one or more accelerators.

The present disclosure may be implemented in various ways, including a method, an apparatus (system), or a non-transitory readable storage medium storing instructions.

A method for generating an intermediate representation for a program for execution on an accelerator may be executed by one or more processors and may include hooking information on instruction from a program, determining whether the hooked information on instruction is associated with an accelerator, if it is determined that the information on instruction is associated with the accelerator, generating a first intermediate representation for the instruction using information on input and output data and information on instruction included in the instruction, and generating a second intermediate representation for the program for one or more accelerators using the first intermediate representation, and the first intermediate representation and the second intermediate representation may include a plurality of data nodes, one or more operation nodes, and a plurality of edges indicating an input and output relationship between the plurality of data nodes and the one or more operation nodes.

The program may include a deep learning program, and the data of the program may include tensor type data.

The method may further include, if it is determined that the information on instruction is not associated with the accelerator, returning the hooked information on instruction to the program.

The generating the second intermediate representation for the program for one or more accelerators using the first intermediate representation may include determining a form in which the plurality of data nodes included in the first intermediate representation are stored on the one or more accelerators, and storing information on the form in which the plurality of data nodes included in the first intermediate representation are stored on the one or more accelerators, in a second intermediate representation corresponding to the plurality of data nodes included in the first intermediate representation.

The generating the second intermediate representation for the program for one or more accelerators using the first intermediate representation may include generating a second intermediate representation by changing at least one of a plurality of data nodes, one or more operation nodes, or a plurality of edges included in the first intermediate representation.

The generating the second intermediate representation for the program for one or more accelerators using the first intermediate representation may include generating a second intermediate representation by adding at least one of a data node, operation node, or edge not included in the first intermediate representation.

The one or more accelerators may include a plurality of accelerators, and the second intermediate representation for the program may include information on a parallelization method to enable execution on the plurality of accelerators.

The second intermediate representation for the program may include information on instruction executed on the one or more accelerators.

A non-transitory computer-readable recording medium storing instructions for executing, on a computer, a method for generating an intermediate representation for a program for execution on an accelerator is provided.

An information processing system is provided, which may include a memory, and one or more processors connected to the memory and configured to execute one or more computer-readable programs included in the memory, in which the one or more programs may include instructions for hooking information on instruction from a program, determining whether the hooked information on instruction is associated with an accelerator, if it is determined that the information on instruction is associated with the accelerator, generating a first intermediate representation for the instruction using information on input and output data and information on instruction included in the instruction, and generating a second intermediate representation for the program for one or more accelerators using the first intermediate representation, and the first intermediate representation and the second intermediate representation may include a plurality of data nodes, one or more operation nodes, and a plurality of edges indicating an input and output relationship between the plurality of data nodes and the one or more operation nodes.

According to some examples, since the deep learning programs can be executed using one or more accelerators without modification, it can be expected that, by utilizing a plurality of accelerators, faster program execution can be expected than when utilizing a single accelerator.

According to some examples, using an intermediate representation, it is possible to optimize the operations for the deep learning program for execution on one or more accelerators, and accordingly, the program can be efficiently executed on the accelerators.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
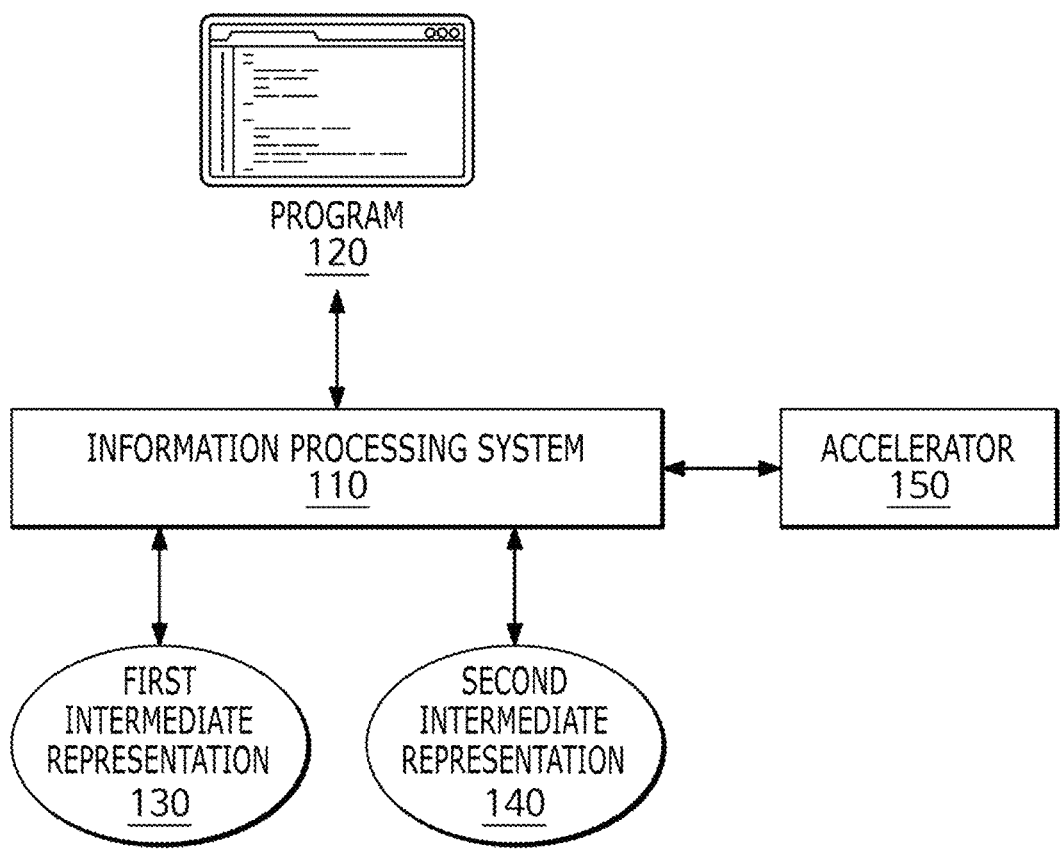
FIG. 1 is a diagram illustrating an example of a method for generating an intermediate representation for a program for execution on an accelerator by an information processing system.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "part" used herein refers to a software or hardware component, and "module" or "part" performs certain roles. However, the meaning of the "module" or "part" is not limited to software or hardware. The "module" or "part" may be configured to be in an addressable storage medium or configured to play one or more processors. Accordingly, as an example, the "module" or "part" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "parts" may be combined into a smaller number of components and "modules" or "parts", or further divided into additional components and "modules" or "parts."

The "module" or "part" may be implemented as a processor and a memory. The "processor" should be interpreted broadly to encompass a general-purpose processor, a Central Processing Unit (CPU), a microprocessor, a Digital Signal Processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "system" may refer to at least one of a server apparatus and a cloud apparatus, but is not limited thereto. For example, the system may include one or more server apparatus. In another example, the system may include one or more cloud apparatus. In still another example, the system may include both the server apparatus and the cloud apparatus operated in conjunction with each other.

In the present disclosure, "each of a plurality of A" may refer to each of all components included in the plurality of A, or may refer to each of some of the components included in a plurality of A.

In the present disclosure, "instruction" or "information on instruction" may refer to operations, function calls, data access, data input and output, data transfer, messages, events, branches, etc. that occur between software components in a program.

"Hooking" as used herein may refer to instructions, method, or action for intercepting operations, function calls, data access, data input and output, data transfer, messages, events, branches, etc. that occur between software components in the program.

In the present disclosure, "intermediate representation" may refer to a graph and/or information associated therewith that has the same meaning as the program and is generated to efficiently execute the program. The intermediate representation may include one or more nodes and one or more edges.

In some examples of the present disclosure, "generating an intermediate representation" or "adding a node or edge to an intermediate representation" may include storing or updating information associated with the intermediate representation in the memory of an information processing system, etc.

FIG. 1 is a diagram illustrating an example of a method for generating, by an information processing system 110, intermediate representations 130 and 140 for a program 120 for execution on an accelerator 150. The information processing system 110 may hook information from the program 120, generate a first intermediate representation 130 that has the same meaning as the program 120, and convert the first intermediate representation 130 into a second intermediate representation 140 for execution of the program on one or more accelerators 150, so that it is possible to execute the second intermediate representation 140 corresponding to the program 120 on the one or more accelerators 150. For example, the information processing system 110 may hook information on instruction from the program 120. As a specific example, the information processing system 110 may hook the information on instruction from the program 120. In addition, the information processing system 110 may extract, from the program 120, information on instruction such as type of operation associated with the instruction, information on input and output data of the operation, parameters of the operation, etc.

The program 120 may refer to any program that includes data and operations, and may include a deep learning program, for example. In addition, the data may be implemented as any data type that may construct a (deep learning) program, and may include, for example, tensor type data, etc. The information processing system 110 may extract information on the data type, size of each dimension, etc. from the tensor type data included in the deep learning program.

The information processing system 110 may generate the first intermediate representation 130 for the program 120 using the information on instruction extracted from the program 120. For example, the information processing system 110 may hook the information on instruction (e.g., a function call) from the program 120 and determine whether the information on instruction is associated with the accelerator 150. If it is determined that the hooked information on instruction (e.g., function call) is associated with the accelerator 150, the information processing system 110 may generate the first intermediate representation 130 using the corresponding information on instruction. The first intermediate representation 130 may be represented in the form of a graph including nodes and edges. For example, data and operations associated with the instruction extracted from the program 120 may be represented as nodes, and the input and output relationship between the data and the operations may be represented as edges.

The information processing system 110 may convert the first intermediate representation 130 into the second intermediate representation 140 suitable for execution on the accelerator 150. In this case, the information processing system 110 may generate the second intermediate representation 140 in consideration of the form in which the data associated with the instruction is stored in one or more accelerators and/or whether the operation associated with the instruction can be performed in parallel without dependency on one or more accelerators. For example, the information processing system 110 may convert a specific operation included in the first intermediate representation 130 into another operation having the same effect and add the converted operation to the second intermediate representation 140. Alternatively, the information processing system 110 may add a new operation associated with the instruction. The second intermediate representation 140 may be represented in the form of a graph including nodes and edges.

If the second intermediate representation 140 for the program 120 is constructed as described above, instead of sequentially executing the instructions of the program 120 in sequence, the second intermediate representation 140 may be executed and the program can be executed using a plurality of accelerators without modifying the program.

Figure 2:
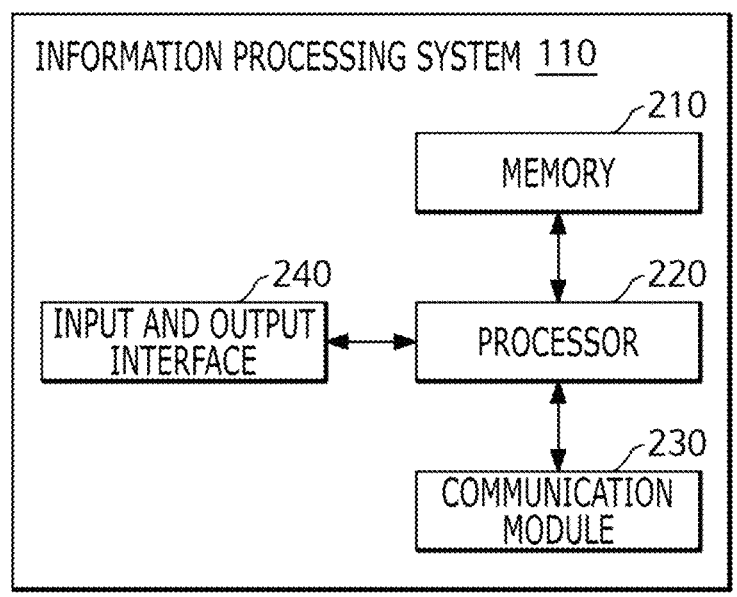
FIG. 2 is a block diagram illustrating an internal configuration of an information processing system.

FIG. 2 is a block diagram illustrating an internal configuration of the information processing system 110. The information processing system 110 may include a memory 210, a processor 220, a communication part 230, and an input and output interface 240. As illustrated in FIG. 2, the information processing system 110 may be configured to communicate information and/or data through a network by using the communication part 230.

The memory 210 may include any non-transitory computer-readable recording medium. The memory 210 may include a permanent mass storage device such as random access memory (RAM), read only memory (ROM), disk drive, solid state drive (SSD), flash memory, etc. In another example, a non-destructive mass storage device such as ROM, SSD, flash memory, disk drive, etc. may be included in the information processing system 110 as a separate permanent storage device that is distinct from the memory. In addition, the memory 210 may store an operating system and at least one program code (e.g., a code for installed and driven in the information processing system 110 for generating and converting an intermediate representation).

These software components may be loaded from a computer-readable recording medium separate from the memory 210. Such a separate computer-readable recording medium may include a recording medium directly connectable to the information processing system 110, and may include a computer-readable recording medium such as a floppy drive, a disk, a tape, a DVD/CD-ROM drive, a memory card, etc., for example. In another example, the software components may be loaded into the memory 210 through the communication part 230 rather than the computer-readable recording medium. For example, at least one program may be loaded into the memory 210 based on a computer program (e.g., a program for generating and converting intermediate representation, etc.) installed by files provided through the communication part 230 by a developer or a file distribution system that distributes application installation files.

The processor 220 may be configured to process the instructions of the computer program by performing basic arithmetic, logic, and input and output operations. The commands may be provided to a user terminal (not illustrated) or another external system by the memory 210 or the communication part 230. For example, the processor 220 may hook the information on instruction from a program, determine whether the hooked information on instruction is associated with an accelerator, and if it is determined that the information on instruction is associated with the accelerator, generate a first intermediate representation using the information on instruction, and generate, using the first intermediate representation, a second intermediate representation for the program for one or more accelerators.

The communication part 230 may provide a configuration or function for the user terminal (not illustrated) and the information processing system 110 to communicate with each other through a network, and may provide a configuration or function for the information processing system 110 to communicate with an external system (e.g., a separate cloud system). For example, control signals, instructions, data, and the like provided under the control of the processor 220 of the information processing system 110 may be transmitted to the user terminal and/or the external system through the communication part 230 and the network through the communication part of the user terminal and/or an external system. For example, the user terminal and/or an external system may receive program execution results, etc. from the information processing system 110.

In addition, the input and output interface 240 of the information processing system 110 may be a means for interfacing with an apparatus (not illustrated) for inputting or outputting, which may be connected to the information processing system 110 or included in the information processing system 110. In FIG. 2, the input and output interface 240 is illustrated as a component configured separately from the processor 220, but aspects are not limited thereto, and the input and output interface 240 may be configured to be included in the processor 220. The information processing system 110 may include more components than those illustrated in FIG. 2. Meanwhile, most of the related components may not necessarily require exact illustration.

The processor 220 of the information processing system 110 may be configured to manage, process, and/or store the information and/or data received from a plurality of user terminals and/or a plurality of external systems. The processor 220 may hook information on instruction from the program from a user terminal and/or an external system. In this case, the processor 220 may determine whether the hooked information on instruction is associated with the accelerator, and if so, may generate a first intermediate representation using the information on instruction.

Figure 3:
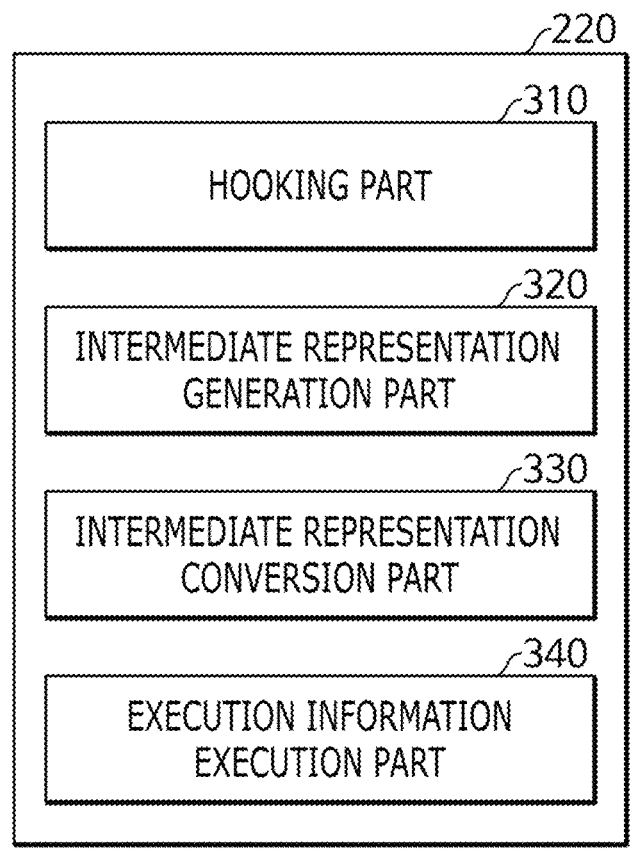
FIG. 3 is a block diagram of an internal configuration of a processor.

FIG. 3 is a block diagram illustrating an internal configuration of the processor 220. As illustrated, the processor 220 may include a hooking part 310, an intermediate representation generation part 320, an intermediate representation conversion part 330, and an intermediate representation execution part 340. The internal configuration of the processor 220 illustrated in FIG. 3 is merely an example and may be implemented differently in some examples. For example, the processor 220 may further include other configurations than those illustrated, and at least part of the illustrated configurations may be omitted. In addition, FIG. 3 illustrates that the processor 220 is a single processor, but aspects are not limited thereto, and may include a plurality of processors. In addition, FIG. 3 illustrates that the processor is divided into individual parts from a functional perspective, but this does not necessarily mean that the processor is physically separated.

The hooking part 310 may hook the information on instruction from the program and determine whether the hooked information on instruction is associated with an accelerator. The program may include a program generated using a deep learning framework. For example, the hooking part 310 may hook a function call from a program a function call and determine whether the hooked function call is associated with an accelerator (e.g., Graphics Processing Unit, GPU). If it is determined that the hooked function call is not associated with the accelerator, the hooking part 310 may return the corresponding function call to the program (or, to the deep learning framework). For example, if the hooked function call corresponds to a simple utility function, the hooking part 310 may return the corresponding function call to the program (or, to the deep learning framework) to make it appear to the user as if the corresponding function is not hooked. On the other hand, if it is determined that the hooked function call is associated with the accelerator, the hooking part 310 may transmit information on the input and output data included in the function and the information on instruction to the intermediate representation generation part 320. At this time, the operation on the corresponding function may not be performed. At this time, the hooking part 310 may return, to the program (or, to the deep learning framework), dummy data generated with an interface (e.g., size information of variable or constant, data type of variable or constant) same as the result of operation on the function so as to make it appear to the user as if the operation is actually performed.

The intermediate representation generation part 320 may generate a first intermediate representation using the information on input and output data and the information on instruction included in the instruction. The first intermediate representation may be represented in the form of a graph including nodes representing data and operations, and edges representing the input and output relationship between the data and the operations. In the nodes stored in the intermediate representation, information included in the data (e.g., a tensor in a deep learning framework), such as dimension information, data type, and whether a gradient is needed, may be stored.

The intermediate representation conversion part 330 may use the first intermediate representation to generate a second intermediate representation that can be executed on one or more accelerators. For example, the intermediate representation conversion part 330 may determine the form in which the data stored in the first intermediate representation is distributed and stored in a plurality of accelerators and the manner in which the operation stored in the first intermediate representation is performed in parallel on the plurality of accelerators. Based on this, the intermediate representation conversion part 330 may generate a second intermediate representation by converting the data and operations included in the first intermediate representation to be suitable for execution on a plurality of accelerators. The second intermediate representation may be represented in the form of a graph including nodes representing data and operations, and edges representing the input and output relationship between the data and the operations. In addition, the second intermediate representation may store information on the manner in which data is distributed and stored in a plurality of accelerators. Additionally, the intermediate representation conversion part 330 may combine a plurality of operations stored in the first intermediate representation into one operation or delete unnecessary operations stored in the first intermediate representation, thereby optimizing the program.

The intermediate representation execution part 340 may execute the second intermediate representation on one or more accelerators. The intermediate representation execution part 340 may be configured to receive, as input, the first intermediate representation or the second intermediate representation and issue instructions to one or more accelerators to perform the operation.

Figure 4:
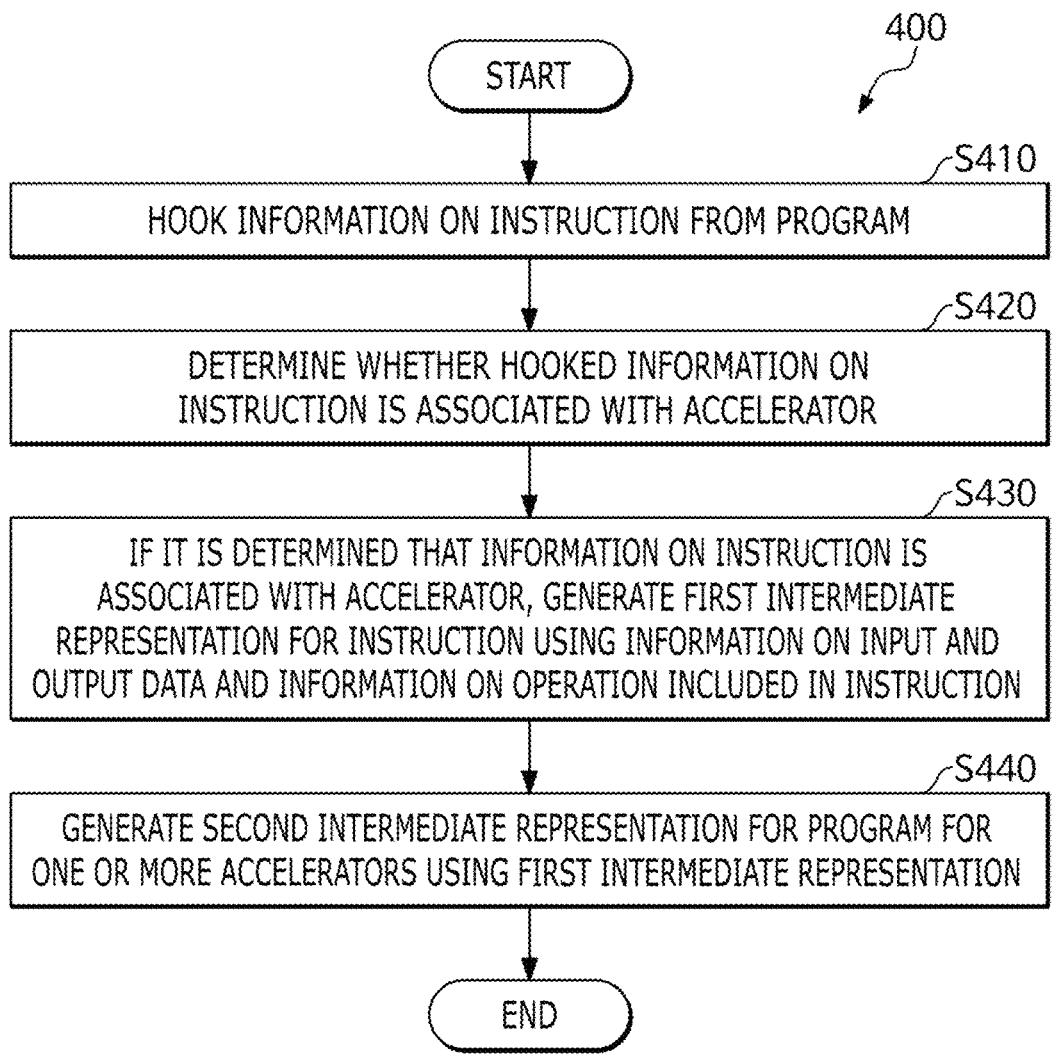
FIG. 4 is a flowchart illustrating an example of a method for generating an intermediate representation for a program for execution on an accelerator.

FIG. 4 is a flowchart illustrating an example of a method 400 for generating an intermediate representation for a program for execution on an accelerator. The method 400 may be initiated by a processor (e.g., a processor of an information processing system) hooking, from the program, the information on instruction (e.g., function call), at S410. The program may include data and a plurality of operations, and for example, the program may include a deep learning program, and the data may include tensor type data.

The processor may determine whether the hooked information on instruction is associated with the accelerator, at S420. If it is determined that the information on instruction is not associated with the accelerator, the processor may return the hooked information on instruction to the framework for the program. The framework for the program may include a PyTorch framework.

If it is determined that the information on instruction is associated with the accelerator, the processor may generate a first intermediate representation for the instruction using the information on input and output data and the information on instruction included in the instruction, at S430. The intermediate representation may refer to a graph and/or information associated therewith that has the same meaning as the program and is generated to efficiently execute the program. The intermediate representation may include a plurality of data nodes, a plurality of operation nodes, and a plurality of edges representing input/output relationships between the plurality of data nodes and the plurality of operation nodes.

The processor may generate a second intermediate representation for the program for one or more accelerators using the first intermediate representation, at S440. For example, the processor may generate the second intermediate representation by changing at least one of a plurality of data nodes, one or more operation nodes, or a plurality of edges included in the first intermediate representation. In another example, the processor may generate a second intermediate representation by adding at least one of a data node, an operation node or an edge not included in the first intermediate representation.

The processor may store, in the second intermediate representation, information on the form in which the data nodes stored in the first intermediate representation are stored in one or more accelerators. For example, the processor may determine a form in which a plurality of data nodes included in the first intermediate representation are stored in one or more accelerators. In addition, the processor may store the information on the form in which the plurality of data nodes included in the first intermediate representation are stored in the one or more accelerators, in the plurality of data nodes included in the second intermediate representation corresponding to the plurality of data nodes included in the first intermediate representation.

The second intermediate representation for the program may include information on instruction for execution on one or more accelerators. In addition, the one or more accelerators may include a plurality of accelerators, and the second intermediate representation for the program may include information on a parallelization method to enable execution on the plurality of accelerators.

With this configuration, since the deep learning programs can be executed using one or more accelerators without modification, it can be expected that by utilizing multiple accelerators, faster program execution can be expected than when utilizing a single accelerator.

Figure 5:
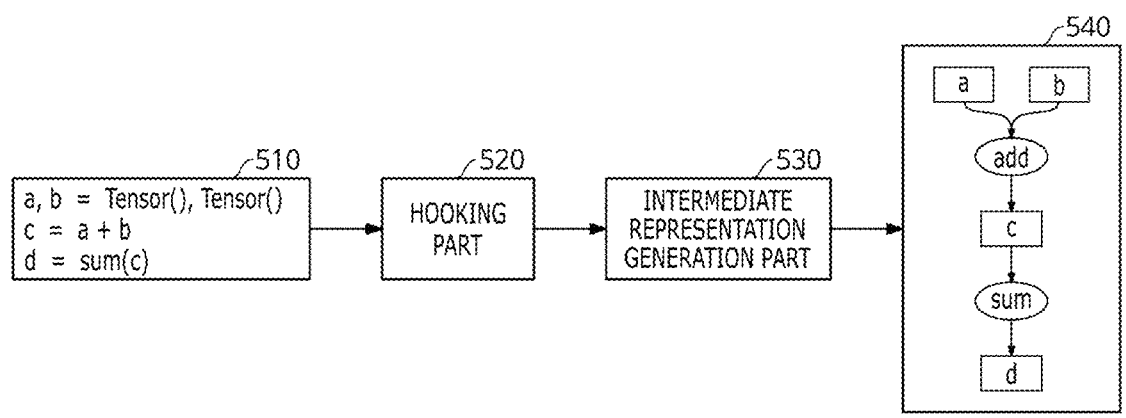
FIG. 5 is a diagram illustrating an example of a method for generating a first intermediate representation for instructions of a program.

FIG. 5 is a diagram illustrating an example of a method for generating a first intermediate representation 540 for the instruction of a program 510. A processor (e.g., the processor 220 of FIG. 2, etc.) may hook information on instruction from the program 510 and generate the first intermediate representation 540 using the information included in the instruction. The program may include a deep learning program, and the data of the program may include tensor type data.

Specifically, the processor may hook the information on instruction from the program 510 using a hooking part 520. The processor may determine whether the hooked information on instruction is associated with the accelerator. If it is determined that the information on instruction is associated with the accelerator, the processor may generate the first intermediate representation 540 for the instruction using an intermediate representation generation part 530 based on the information on input and output data and the information on operation included in the instruction. For example, if the information on instruction is information associated with a simple utility function, the processor may determine that the information is not associated with the accelerator. In this case, the processor may return the hooked information on instruction to the program (or, to the deep learning framework). On the other hand, if the information on instruction is information associated with a data generator (that is, with a tensor generator in the case of a deep learning program), information association with instruction associated with the operation, etc., the processor may determine that the information is associated with the accelerator. In this case, the processor may generate an intermediate representation based on the information on input and output data and the information on instruction included in the hooked information on instruction.

For example, as illustrated, if a tensor is generated through "a, b=Tensor( ), Tensor( )" from the program 510, the processor may hook a tensor generator such as "a, b=Tensor( ), Tensor( )" associated with the accelerator from the program 510 using the hooking part 520. The processor may convert the tensors "a" and "b" into data nodes by using the intermediate representation generation part 530 and store the converted result in the first intermediate representation 540. If the "c=a+b" operation is executed on the program 510, the processor may transmit, using the hooking part 520, the addition ("+") operator to the intermediate representation generation part 530, and the processor may add an "add" operation node to the first intermediate representation 540 and an edge indicating the input and output relationship between the nodes. If the "d=sum(c)" operation is executed on the program 510, the processor may transmit, using the hooking part 520, the "sum" operator to the intermediate representation generation part 530, and the processor may add an "sum" operation node to the first intermediate representation 540 and an edge indicating the input and output relationship between the nodes. During this process, the operations stored in the intermediate representation may not actually be performed. The operation stored in the intermediate representation may be executed by the intermediate representation execution part when the user attempts to read the values of the "c" and/or "d" tensors, which are the operation result tensors, through a program.

Figure 6:
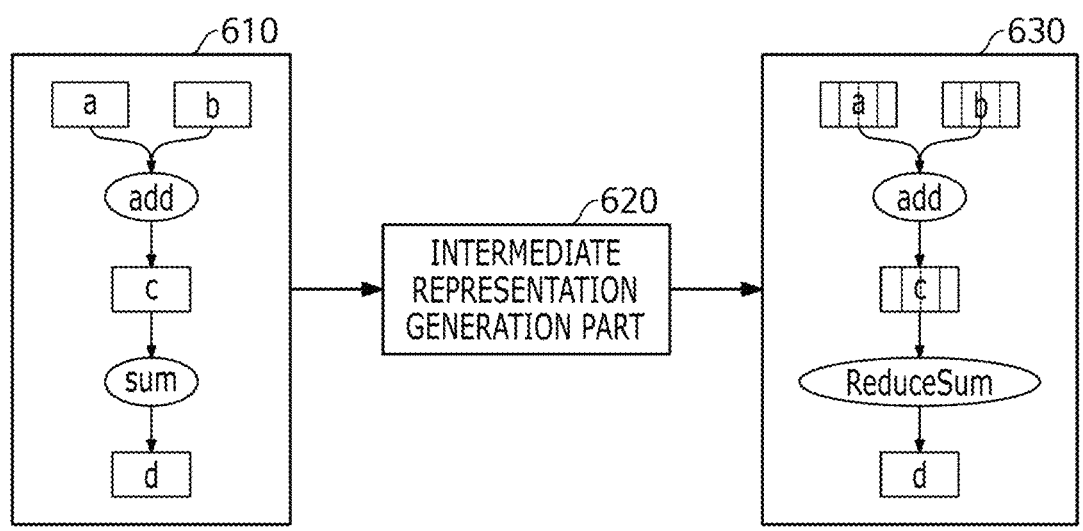
FIG. 6 is a diagram illustrating an example of a method for generating a second intermediate representation for execution of a program on an accelerator.

FIG. 6 is a diagram illustrating an example of a method for generating a second intermediate representation 630 for execution of a program on an accelerator. A processor (e.g., the processor 220 of FIG. 2, etc.) may use a first intermediate representation 610 to generate the second intermediate representation 630 for the program that can be executed on one or more accelerators. For example, the processor may generate the second intermediate representation 630 by changing at least one of a plurality of data nodes, one or more operation nodes, or a plurality of edges included in the first intermediate representation 610 using an intermediate representation conversion part 620.

The processor may determine a form in which a plurality of data nodes included in the first intermediate representation 610 are stored in one or more accelerators. In addition, the processor may store the information on the form in which the plurality of data nodes included in the first intermediate representation 610 are stored on the one or more accelerators, in the second intermediate representation 630 corresponding to the plurality of data nodes included in the first intermediate representation. Additionally, the processor may include, in the second intermediate representation 630 for the program, information on a parallelization method to enable execution on the plurality of accelerators.

For example, the processor may determine the form in which the "add" operation of the first intermediate representation 610 is stored in one or more accelerators. Since the "add" operation corresponds to an operation independently applied to each element of the tensor, the intermediate representation conversion part 620 may store "a", "b", and "c" tensors, which are input and output data, divided into the same size in each of a plurality of accelerators for the "add" operation of the first intermediate representation, and store, in the second intermediate representation 630, the information on parallelization method that enables the "add" operation and each of the plurality of accelerators to be executed in parallel.

For another example, the processor may determine the form in which the "sum" operation of the first intermediate representation 610 is stored in one or more accelerators. The "sum" operation is an operation that adds up all operations of the tensor, and the resulting tensor of the corresponding operation has a single scalar value, so it cannot be divided and stored into multiple GPUs. Accordingly, the intermediate representation conversion part 620 may store, in the second intermediate representation 630, information to prevent the "d" tensor, which is the tensor resulting from the "sum" operation, from being divided and stored into multiple GPUs.

The processor may generate the second intermediate representation 630 by changing at least one of a plurality of data nodes, one or more operation nodes, or a plurality of edges included in the first intermediate representation 610. For example, as illustrated, the processor may generate the second intermediate representation by changing the "sum" operation to the "ReduceSum" operation which includes a process of combining information divided into multiple GPUs, by using the intermediate representation conversion part 620, at 630.

Figure 7:
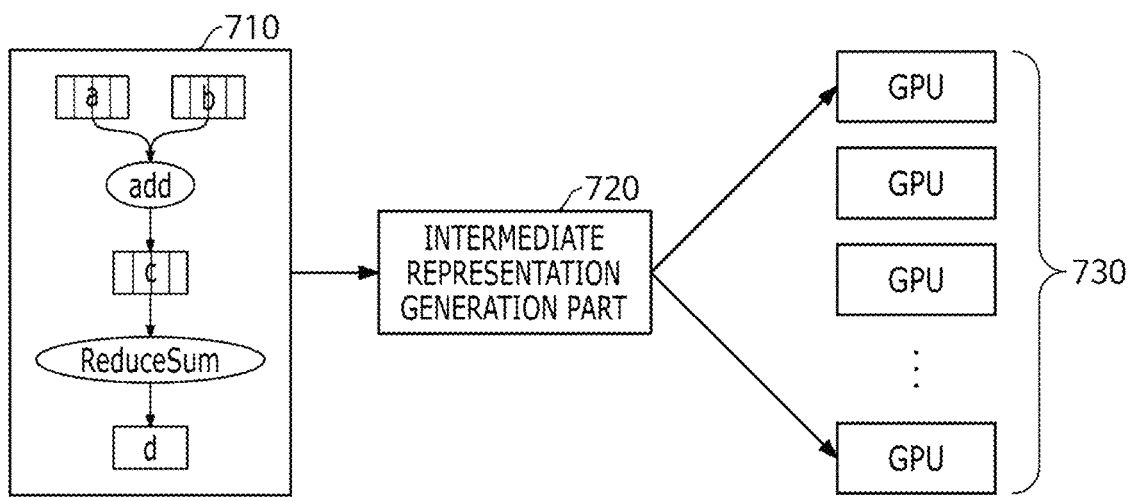
FIG. 7 is a diagram illustrating an example of a method for executing a program on an accelerator using the second intermediate representation.

FIG. 7 is a diagram illustrating an example of a method for executing a program on an accelerator using the second intermediate representation. The processor (e.g., the processor 220 of FIG. 2, etc.) may input a second intermediate representation 710 into an intermediate representation execution part 720 to execute the second intermediate representation 710 through one or more accelerators 730. The second intermediate representation for the program may include information on instruction executed on the one or more accelerators 730. The one or more accelerators 730 may include a Graphics Processing Unit (GPU).

Since the operations of the second intermediate representation 710 are configured for immediate execution on the one or more accelerators 730, the intermediate representation execution part 720 may transmit instructions to each of the one or more accelerators 730 to perform the operations of the second intermediate representation 710 in an appropriate order, that is, in the topological order of the graph in the intermediate representation to execute the program.

The method described above may be provided as a computer program stored in a computer-readable recording medium for execution on a computer. The medium may be a type of medium that continuously stores a program executable by a computer, or temporarily stores the program for execution or download. In addition, the medium may be a variety of writing means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The instructions may be executable by one or more processors, and may cause the processor(s) to perform certain aspects of the functions described in the present disclosure.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method for generating an intermediate representation for a program for execution on an accelerator, the method being executed by one or more processors and comprising:
   hooking information on instruction from a program;
   determining whether the hooked information on instruction is associated with an accelerator;
   if it is determined that the information on instruction is not associated with the accelerator, returning the hooked information on instruction to the program;
   if it is determined that the information on instruction is associated with the accelerator, generating a first intermediate representation for the instruction using information on input and output data and information on instruction included in the instruction; and
   generating a second intermediate representation for the program for one or more accelerators using the first intermediate representation,
   wherein the first intermediate representation and the second intermediate representation include a plurality of data nodes, one or more operation nodes, and a plurality of edges indicating an input and output relationship between the plurality of data nodes and the one or more operation nodes.

2. The method according to claim 1, wherein the program includes a deep learning program, and data of the program includes tensor type data.

3. The method according to claim 1, wherein the generating the second intermediate representation for the program for one or more accelerators using the first intermediate representation includes:
   determining a form in which the plurality of data nodes included in the first intermediate representation are stored on the one or more accelerators; and
   storing information on the form in which the plurality of data nodes included in the first intermediate representation are stored on the one or more accelerators, in a second intermediate representation corresponding to the plurality of data nodes included in the first intermediate representation.

4. The method according to claim 1, wherein the generating the second intermediate representation for the program for one or more accelerators using the first intermediate representation includes:
   generating a second intermediate representation by changing at least one of a plurality of data nodes, one or more operation nodes, or a plurality of edges included in the first intermediate representation.

5. The method according to claim 1, wherein the generating the second intermediate representation for the program for one or more accelerators using the first intermediate representation includes:
   generating a second intermediate representation by adding at least one of a data node, an operation node, or an edge not included in the first intermediate representation.

6. The method according to claim 1, wherein the one or more accelerators include a plurality of accelerators, and
   the second intermediate representation for the program includes information on a parallelization method to enable execution on the plurality of accelerators.

7. The method according to claim 1, wherein the second intermediate representation for the program includes information on instruction executed on the one or more accelerators.

8. A non-transitory computer-readable recording medium storing instructions that, when executed by one or more processors, cause performance of the method according to claim 1.

9. An information processing system, comprising:
   a memory; and one or more processors connected to the memory and configured to execute one or more computer-readable programs included in the memory, wherein the one or more programs include instructions for:

hooking information on instruction from a program;

determining whether the hooked information on instruction is associated with an accelerator;

if it is determined that the information on instruction is not associated with the accelerator, returning the hooked information on instruction to the program;

if it is determined that the information on instruction is associated with the accelerator, generating a first intermediate representation for the instruction using information on input and output data and information on instruction included in the instruction; and generating a second intermediate representation for the program for one or more accelerators using the first intermediate representation, and the first intermediate representation and the second intermediate representation include a plurality of data nodes, one or more operation nodes, and a plurality of edges indicating an input and output relationship between the plurality of data nodes and the one or more operation nodes.

10. A method for generating an intermediate representation for a program for execution on an accelerator, the method being executed by one or more processors and comprising:

hooking information on instruction from a program;

determining whether the hooked information on instruction is associated with an accelerator;

if it is determined that the information on instruction is associated with the accelerator, generating a first intermediate representation for the instruction using information on input and output data and information on instruction included in the instruction; and generating a second intermediate representation for the program for one or more accelerators using the first intermediate representation, wherein the first intermediate representation and the second intermediate representation include a plurality of data nodes, one or more operation nodes, and a plurality of edges indicating an input and output relationship between the plurality of data nodes and the one or more operation nodes, and wherein the one or more accelerators include a plurality of accelerators, and the second intermediate representation for the program includes information on a parallelization method to enable execution on the plurality of accelerators.

11. The method according to claim 10, wherein the program includes a deep learning program, and data of the program includes tensor type data.

12. The method according to claim 10, wherein the generating the second intermediate representation for the program for one or more accelerators using the first intermediate representation includes:

determining a form in which the plurality of data nodes included in the first intermediate representation are stored on the one or more accelerators; and storing information on the form in which the plurality of data nodes included in the first intermediate representation are stored on the one or more accelerators, in a second intermediate representation corresponding to the plurality of data nodes included in the first intermediate representation.

13. The method according to claim 10, wherein the generating the second intermediate representation for the program for one or more accelerators using the first intermediate representation includes:

generating a second intermediate representation by changing at least one of a plurality of data nodes, one or more operation nodes, or a plurality of edges included in the first intermediate representation.

14. The method according to claim 10, wherein the generating the second intermediate representation for the program for one or more accelerators using the first intermediate representation includes:

generating a second intermediate representation by adding at least one of a data node, an operation node, or an edge not included in the first intermediate representation.

15. The method according to claim 10, wherein the second intermediate representation for the program includes information on instruction executed on the one or more accelerators.

16. A non-transitory computer-readable recording medium storing instructions that, when executed by one or more processors, cause performance of the method according to claim 10.

* * * * *